United States Patent
Gubbi Lakshminarasimha et al.

(10) Patent No.: US 10,599,946 B2
(45) Date of Patent: Mar. 24, 2020

(54) SYSTEM AND METHOD FOR DETECTING CHANGE USING ONTOLOGY BASED SALIENCY

(71) Applicant: Tata Consultancy Services Limited, Mumbai (IN)

(72) Inventors: Jayavardhana Rama Gubbi Lakshminarasimha, Bangalore (IN); Karthikeyan Vaiapury, Chennai (IN); Mariswamy Girish Chandra, Bangalore (IN); Balamuralidhar Purushothaman, Bangalore (IN); Shailesh Shankar Deshpande, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 161 days.

(21) Appl. No.: 15/869,311

(22) Filed: Jan. 12, 2018

(65) Prior Publication Data
US 2018/0268247 A1    Sep. 20, 2018

(30) Foreign Application Priority Data
Mar. 15, 2017 (IN) .............................. 201721008937

(51) Int. Cl.
*G06K 9/46* (2006.01)
*G06K 9/00* (2006.01)
(Continued)

(52) U.S. Cl.
CPC ......... *G06K 9/4671* (2013.01); *G06K 9/0063* (2013.01); *G06K 9/00791* (2013.01);
(Continued)

(58) Field of Classification Search
CPC .. G06K 9/4671; G06K 9/4676; G06K 9/0063; G06K 9/00637; G06K 9/00651;
(Continued)

(56) References Cited

U.S. PATENT DOCUMENTS

| 6,275,612 B1 | 8/2001 | Imoto |
| 8,494,302 B2 | 7/2013 | Ding et al. |

(Continued)

FOREIGN PATENT DOCUMENTS

CN 104103082 10/2014

OTHER PUBLICATIONS

Katramados, I. et al. "Real-Time Visual Saliency by Division of Gaussians," *Proceedings of the 18th IEEE International Conference on Image Processing 2011*, Sep. 11-14, 2011, Brussels, Belgium; pp. 1701-1704.

(Continued)

*Primary Examiner* — Tsung Yin Tsai
*Assistant Examiner* — Stephen M Brinich
(74) *Attorney, Agent, or Firm* — Finnegan, Henderson, Farabow, Garrett & Dunner LLP

(57) ABSTRACT

A system and method for identifying real time change in a scene of an unknown environment using an unmanned vehicle. In the context of unmanned vehicle navigation, it is critical to calculate the saliency map in real time and employ them in scene understanding. This will reduce the search space and ensure that the process is quicker. A domain specific ontology is created and a saliency model is developed. The saliency model detects key domain specific regions of interest in two consecutive images. The regions of interest is used for registration and change detection. The system is detecting the change by using visual saliency as an (Continued)

abstract feature that is developed in the environment. Probability of change is derived using the salient maps of the two images.

12 Claims, 3 Drawing Sheets

(51) Int. Cl.
*G06K 9/32* (2006.01)
*G06K 9/62* (2006.01)

(52) U.S. Cl.
CPC ......... *G06K 9/3241* (2013.01); *G06K 9/4623* (2013.01); *G06K 9/6215* (2013.01); *G06K 2009/3291* (2013.01); *G06K 2009/6213* (2013.01)

(58) Field of Classification Search
CPC ........... G06K 9/00657; G06K 9/00664; G06K 9/00671; G06K 9/00677; G06K 9/00791; G06K 9/00798; G06K 9/3241; G06K 9/3233; G06K 9/4623; G06K 9/4628; G06K 2009/00644; G06K 2009/6213
USPC ............... 382/103, 100, 107, 149, 236, 232, 382/238–239
See application file for complete search history.

(56) References Cited

U.S. PATENT DOCUMENTS

| | | | |
|---|---|---|---|
| 8,649,606 B2 | 2/2014 | Zhao et al. | |
| 9,122,949 B2 | 9/2015 | Fan et al. | |
| 2009/0304231 A1* | 12/2009 | Lu | G06K 9/3233 382/103 |
| 2014/0254922 A1 | 9/2014 | Wang et al. | |
| 2015/0310303 A1* | 10/2015 | Andreopoulos | G06K 9/4676 382/158 |
| 2017/0372162 A1* | 12/2017 | Wang | G06K 9/4604 |

OTHER PUBLICATIONS

Town, C.P. (Dec. 2004). Ontology based Visual Information Processing (Doctoral dissertation). Retrieved from https://www.cl.cam.ac.uk/~cpt23/papers/TownPhD.pdf.

Ganesh, K. et al. (Jun. 2014). "Ontology and Rule-Based Model for Extracting Semantic Content in Videos," *Journal of Theoretical and Applied Information Technology*, vol. 64, No. 2; pp. 350-355.

Wolf, H. et al. (Dec. 2005). "Image Saliency Mapping and Ranking Using an Extensible Visual Attention Model Based on MPEG-7 Feature Descriptors," *University of Otago: The Information Science Discussion Paper Series*, No. 2005/10; 21 pages.

* cited by examiner

SYSTEM AND METHOD FOR DETECTING CHANGE USING ONTOLOGY BASED SALIENCY

PRIORITY CLAIM

This U.S. patent application claims priority under 35 U.S.C. § 119 to India Application No. 201721008937, filed on Mar. 15, 2017. The entire contents of the abovementioned application are incorporated herein by reference.

TECHNICAL FIELD

The embodiments herein generally relates to a system and method for visual based autonomous change detection using unmanned vehicles and, more particularly, determining about an object using visual change and using unmanned vehicle to assess and detect change in the object of interest in an unknown environment.

BACKGROUND

Visual based autonomous defect/change detection using unmanned vehicles is in its infancy. Given details about an object using visual input and using an unmanned vehicle to assess and detect change in the object of interest in currently unfeasible. Due to limited computational and communication resources on the unmanned vehicle, automatic change detection is non-trivial. A new paradigm of visual change detection methods are required that can work in real time.

Visual change detection is an extremely challenging task and it involves significant challenges due to variation in illumination, lighting and other environmental conditions. In traditional saliency, features are captured based on well-known image attributes such as color, orientation, texture, motion etc. However, in complex scenarios these attributes may have different weights. For fast computation during navigation, the regions of interest should be narrowed down based on certain fixed criterion. One such criterion could be ontology of the domain that will force the weight re-adjustment and quickly focuses on the regions of interest. Current saliency detection systems are not controlled using ontology or semantics.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system and method for identifying real time change in state of one or more objects based on ontology.

In one aspect, a system for identifying real time change in state of one or more objects based on ontology. The system comprises a processor, a memory communicatively coupled to the processor and the memory contains instructions that are readable by the processor, a media acquisition module which is configured to capture a plurality of images of an unknown environment. It would be appreciated that the first image of the plurality of images is a predefined reference for a subsequent second image. An identification module of the system is configured to identify at least one salient region of a frame of the first image and at least one salient region of a frame of the second image. The identification of the salient region is based on ontology of a predefined area of interest. Further, a calculation module of the system is configured to calculate the saliency of a plurality of pixels of the first image and the second image, wherein the calculation of the saliency is based on the predefined area of interest and a registration module is configured to register at least two calculated saliency of consecutive image of the plurality of images. The registration is based on Gaussian pyramids calculated in identified salient regions. Further, a comparison module of the system is configured to compare the saliency map of first image with the saliency map of second image to get change using probability of saliency map, wherein the change is based on probability difference in salient regions. Furthermore, the difference estimation between the at least two registered saliency of consecutive images converting saliency values into normalized probabilities using a cost function. In addition to, an analysis module of the system is configured to analyze the change in saliency is localized to identify real time change in state of one or more objects in the unknown environment.

In another aspect, a method for identifying real time change in state of one or more objects based on ontology. The method comprising steps of capturing a plurality of images of an unknown environment, wherein a first image of the plurality of images is a predefined reference for a subsequent second image. Further, the process identifies at least one salient region of a frame of the first image and at least one salient region of a frame of the second image, wherein the identification of the salient region is based on ontology of a predefined area of interest. Calculating the saliency of a plurality of pixels of the first image and the second image, wherein the calculation of the saliency is based on the predefined area of interest and registering at least two calculated saliency of consecutive image of the plurality of images, wherein the registration is based on Gaussian pyramids calculated in salient regions. Further, the process compares the saliency map of first image with saliency map of second image to get change using probability of saliency map, wherein the change is based on normalized probability difference in salient regions and analyzing the change in saliency is localized to identify real time change in state of the one or more objects in the unknown environment.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
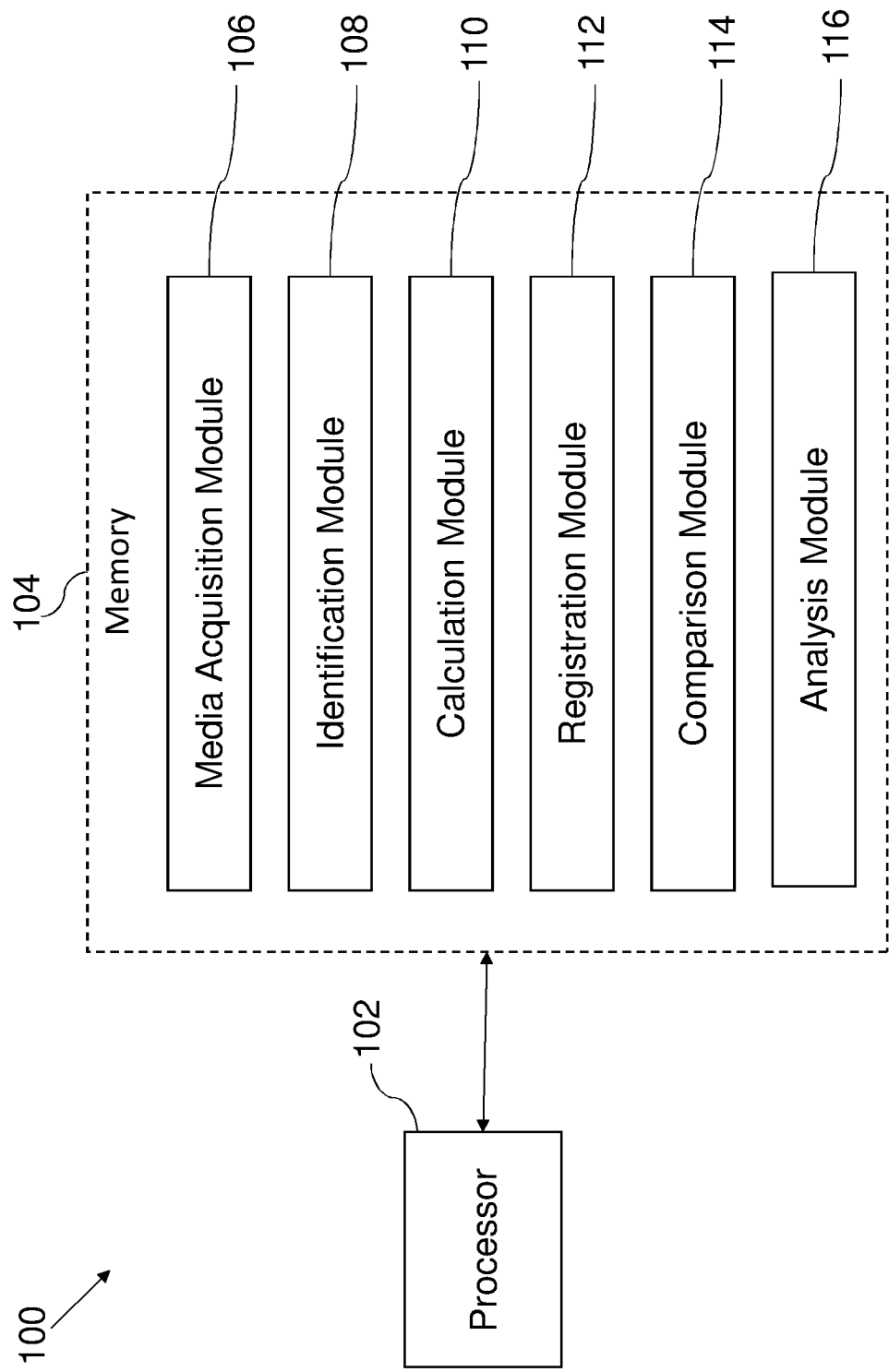
FIG. 1 illustrates a system identifying real time change in state of one or more objects based on ontology according to an embodiment of the present disclosure.

Referring FIG. 1, a system 100 for identifying real time change in state of one or more objects based on ontology. The system 100 comprising a processor 102, a memory 104 communicatively coupled to the processor 102, a media acquisition module 106, an identification module 108, a calculation module 110, a registration module 112, a comparison module 114 and an analysis module 116.

In the preferred embodiment, the memory 104 contains instructions that are readable by the processor 102.

In the preferred embodiment, the media acquisition module 106 is configured to capture a plurality of images of an unknown environment. It would be appreciated that the first image of the plurality of images is a predefined reference for a subsequent second image. In most industrial applications, the change in an object can be defined as insertion, disappearance, deformation, displacement or any other change in the state such as turning of levers. For example, in a street view, there are clearly recognized public and private properties. If household rubbish is placed on the pavement, it will indicate "insertion" within a scene; if a post box or a telephone box is removed, it indicates "disappearance"; if a light pole is hit by a vehicle or due to natural calamities, it indicates "deformation"; and finally if a public rubbish bin is moved from one place to another out of its designated position, it indicates "displacement".

In the preferred embodiment, the identification module is configured to identify at least one salient region of a frame of the first image and at least one salient region of a frame of the second image, wherein the identification of the salient region is based on ontology of a predefined area of interest. Domain specific ontology is developed. For example, the industrial settings have machines, pipes, nuts, bolts, etc. Specific features of interest that represent such objects are extracted. The system defines saliency as a weighted combination of domain specific features. Ontology to weight relationship is derived based on training dataset. In real-time, when a new scene comes in along with related ontology, appropriate weights are chosen to detect salient regions. The salient regions reflect domain specific ontology.

In the preferred embodiment, the calculation module is configured to calculate the saliency of a plurality of pixels of the first image and the second image, wherein the calculation of the saliency is based on the predefined area of interest. The calculation of saliency comprises calculating a spatial distribution of pixel distance in the plurality of pixels of the first image and the second image. The pixel distance is being calculated based on a distance measure between the chromaticity parameters of individual pixel of the plurality of pixels of the first image and the second image.

In another embodiment, a spatio-temporal analysis is used for creating an ontology based saliency model. In this process where the salient region is captured using the input technology. Further, it encompasses appearance and motion features to automatically calculate the spatio-temporal properties of the given data and the use of the same in highlighting saliency.

In yet another embodiment, a probabilistic method is applied to measure real time change in one or more objects using ontology based saliency. Wherein, a new metrics is generated for converting the ontology based saliency maps into probabilities in the context of change detection. In another variant, a real time architecture is being used to calculate visual saliency. In the context of unmanned vehicle navigation, it is critical to calculate the saliency map in real-time and to employ them in unknown environment. Therefore, a pyramidal implementation is being used to provide information at different scales that can speed up the process.

In the preferred embodiment, the overlapping area needs to be compared to detect change. For calculating the change, the system switches back to original saliency maps created in the earlier procedure. It focuses on the overlapping areas of saliency maps. If nothing has changed, the saliency maps have to be similar irrespective of change in environmental condition. If any object has changed (object insertion, deletion, deformation and displacement), the saliency values get scaled. For the reference image, normalize the saliency values and convert to probability in the overlapping region using $$p_{m,n} = \frac{e^{p_{m,n}}}{\sum_{i \in x, j \in y}^{M,N} e^{p_{x,y}}} \quad (1)$$

For the new image, normalization is carried out using values calculated for the first image as a reference. The two saliency maps are compared to find the spots where change occurs. Low valued changes detected are filtered using an empirically chosen threshold $\epsilon$. The resulting map contains changed areas in the 2nd image. Positive values indicate disappearance, negative values indicate insertion and low values within the second threshold $\pi$ will indicate change in state.

In the preferred embodiment, the registration module is configured to register at least two calculated saliency of consecutive image of the plurality of images, wherein the registration is based on Gaussian pyramids calculated in salient regions. There are two key uses of registration. Firstly, it helps in real time navigation, where the subsequent image of the plurality of images are matched with the first image (reference image) at a more abstract level that allows avoiding false alarms and bad registration using low level features. Secondly, visual maps include multi-view videos that is collected and stored as archive. If a new image is presented, accurate and real time registration will aid in localizing the object as well as to detect any change in the scenario. Although many approaches for accurate registration exists, the developed saliency based image registration will perform much faster due to the reduction in matching points/patches. In spite of losing accuracy in registration, the process is fast and suited for change detection application.

The system combines the positive aspects of saliency maps and Gaussian pyramids based registration to detect the overlap and to calculate the features of the interest. This registration process ensures fast calculation provided that there are sufficient regions of interest. In this disclosure the system converts the saliency maps into binary by using an appropriate threshold. It would be appreciated that the threshold can be an adaptive threshold based on the required percentage area. Using this as a mask over the first image and convert the non-salient regions into background. Further, the system creates a Gaussian pyramid for both the foreground maps. Extracting features of the first image corresponding to foreground saliency maps, wherein the features are extracted using center surround operations similar to visual receptive fields. Further, the system matches the extracted features of the identified salient regions of the first image and the subsequent image of the plurality of images to calculate transformation matrix. Thus, the system registers the foreground maps at every scale and finds the registration points. This yields the overlap area between the first image and the subsequent images.

In the preferred embodiment, the comparison module is configured to compare the saliency map of first image with saliency map of second image to get change using probability of saliency map, wherein the change is based on probability difference in salient regions. The resulting map contains changed areas in the subsequent image. Therefore, positive values indicate change in the object such as insertion, disappearance, deformation, displacement or any other change in the state such as turning of levers. Negative values indicate insertion and low values within the second threshold will indicate change in the state.

In the preferred embodiment, the difference between at least two registered saliency maps of consecutive images is estimated by converting saliency values into normalized probabilities using a cost function. The system analyses the overlapping area of saliency maps to estimate the change. If nothing has changed, the saliency maps have to be similar irrespective of change in environmental condition. If any object has changed, the saliency values get scaled. In this process, the system normalizes the saliency values of the first image and convert them to probability in the overlapping region. For the subsequent image, normalization in the saliency values is carried out using values calculated for the first image. From both the saliency maps, low valued changes are detected are filtered using an empirically chosen threshold.

In the preferred embodiment, the analysis module is configured to analyze the change in saliency is localized to identify real time change in state of the one or more objects in the unknown environment.

Figure 2:
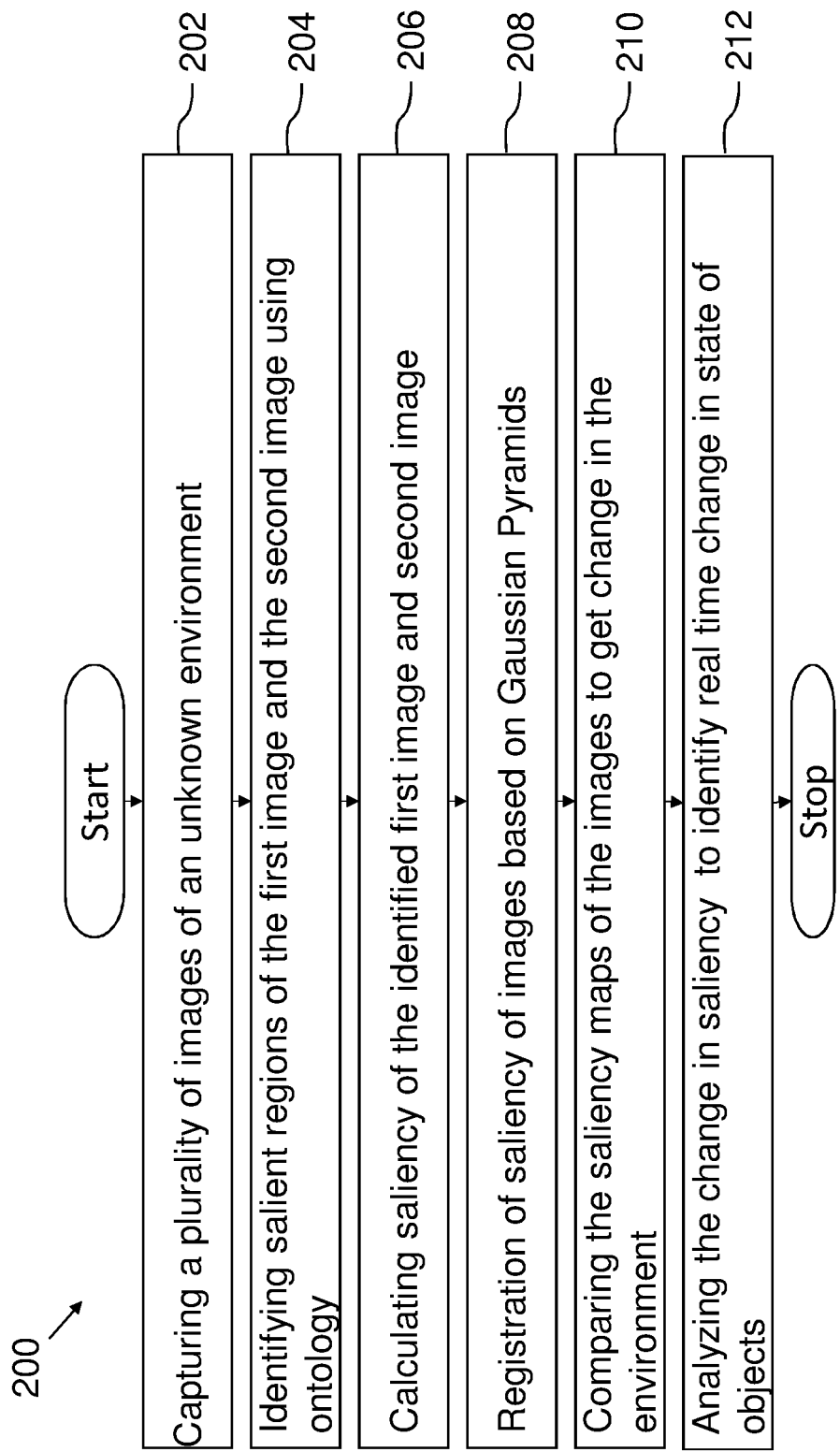
FIG. 2 illustrates a method for identifying real time change in state of one or more objects based on ontology according to an embodiment of the present disclosure.

Referring FIG. 2, a method 200 for identifying real time change in state of one or more objects based on ontology.

Initially, at the step 202, the process captures a plurality of images of an unknown environment, wherein a first image of the plurality of images is a predefined reference for a subsequent second image. It would be appreciated that the first image of the plurality of images is a predefined reference for a subsequent second image. In most industrial applications, the change in an object can be defined as insertion, disappearance, deformation, displacement or any other change in the state such as turning of levers.

At the step 204, the process identifies at least one salient region of a frame of the first image and at least one salient region of a frame of the second image, wherein the identification of the salient region is based on ontology of a predefined area of interest.

At the step 206, where the process calculates the saliency of a plurality of pixels of the first image and the second image, wherein the calculation of the saliency is based on the predefined area of interest. The calculation of saliency comprises calculating a spatial distribution of pixel distance in the plurality of pixels of the first image and the second image. The pixel distance is being calculated based on a distance measure between the chromaticity parameters of individual pixel of the plurality of pixels of the first image and the second image.

At the step 208, where the process registers at least two calculated saliency of consecutive image of the plurality of images, wherein the registration is based on Gaussian pyramids calculated in salient regions. There are two key uses of registration. Firstly, it helps in real time navigation, where the subsequent image of the plurality of images are matched with the first image (reference image) at a more abstract level that allows avoiding false alarms and bad registration using low level features. Secondly, visual maps include multi-view videos that is collected and stored as archive. If a new image is presented, accurate and real time registration will aid in localizing the object as well as to detect any change in the scenario. Although many approaches for accurate registration exists, the developed saliency based image registration will perform much faster due to the reduction in matching points/patches. In spite of losing accuracy in registration, the process is fast and suited for change detection application. Further, the process combines the positive aspects of saliency maps and Gaussian pyramids based registration to detect the overlap and to calculate the features of the interest.

At the step 210, where the process compares the saliency map of first image with saliency map of second image to get change using probability of saliency map, wherein the change is based on probability difference in salient regions. The resulting map contains changed areas in the subsequent image. Therefore, positive values indicate change in the object such as insertion, disappearance, deformation, displacement or any other change in the state such as turning of levers. Negative values indicate insertion and low values within the second threshold will indicate change in the state.

At final step 212, where the process analyzes the change in saliency as localized to identify real time change in state of the one or more objects in the unknown environment.

Figure 3:
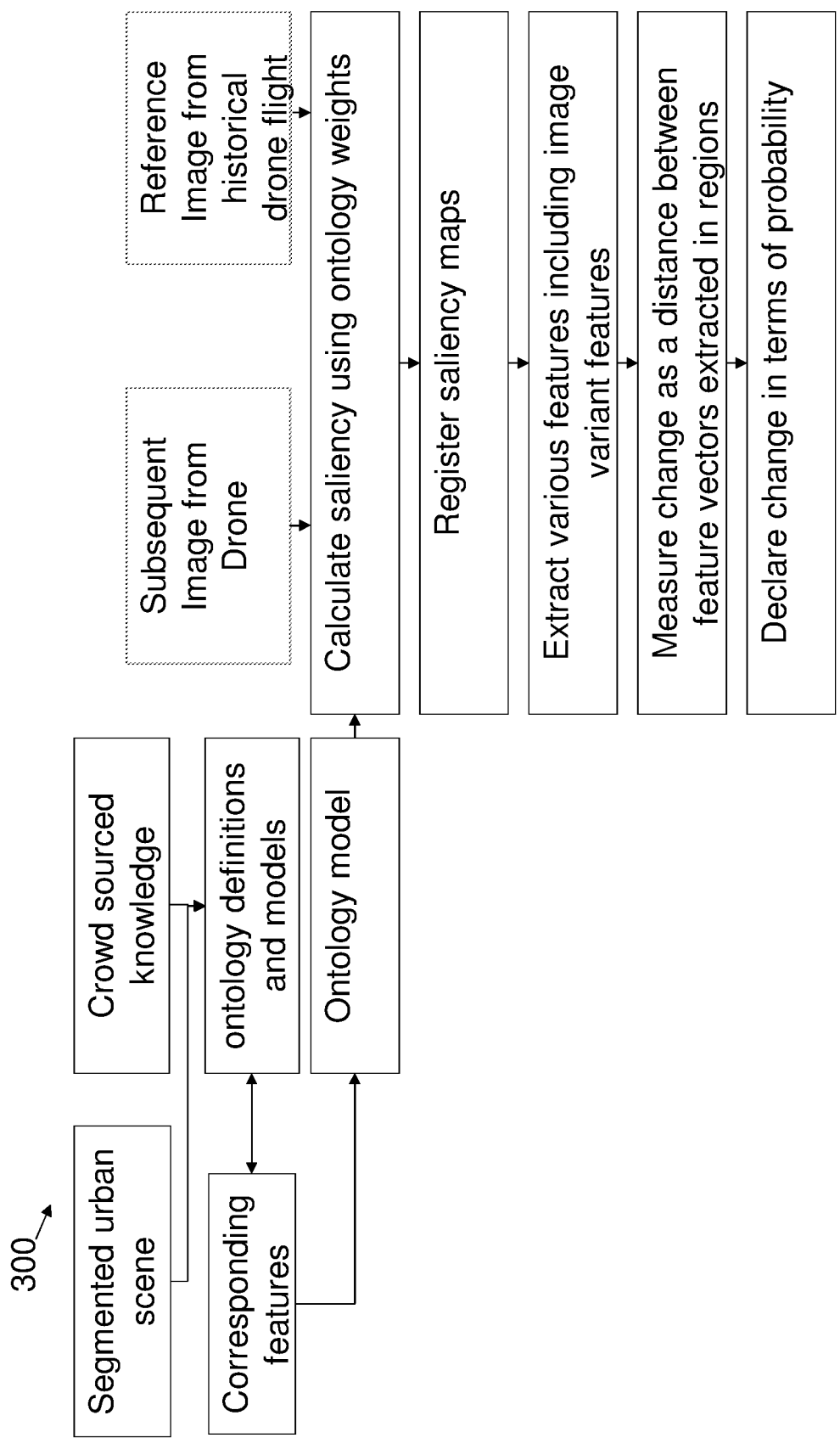
FIG. 3 illustrates an example for identifying real time change in subsequent image from reference image based on ontology according to an embodiment of the present disclosure.

Referring FIG. 3, as an example, for identifying real time change in one or more objects of subsequent image in comparison with referenced image based on ontology. The process identifies at least one salient region of a frame of the reference image and at least one salient region of a frame of the subsequent image, wherein the identification of the salient region is based on ontology of a predefined area of interest. Calculating the saliency of a plurality of pixels of the reference image and the subsequent image, wherein the calculation of the saliency is based on the predefined area of interest. Registering the two calculated saliency of reference image and subsequent image wherein the registration is based on Gaussian pyramids calculated in salient regions. Further, the process compares the saliency map of reference image with saliency map of subsequent image to get change using probability of saliency map, wherein the change is based on normalized probability difference in salient regions and analyzing the change in saliency is localized to identify real time change in state of the objects of subsequent image.

The embodiments of present disclosure herein addresses unresolved problem of visual based autonomous defect/change detection using unmanned vehicles. Visual change detection is an extremely challenging task and it involves significant challenges due to variation in illumination, lighting and other environmental conditions. In traditional saliency, features are captured based on well-known image attributes such as color, orientation, texture, motion etc. However, in complex scenarios these attributes may have different weights. For fast computation during navigation, the regions of interest should be narrowed down based on certain fixed criterion.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A method for identifying real time change in state of one or more objects based on ontology, the method comprising:

capturing a plurality of images of an unknown environment, wherein a first image of the plurality of images is a predefined reference for a subsequent second image;

identifying at least one salient region of a frame of the first image and at least one salient region of a frame of the second image, wherein the identification of the salient regions is based on ontology of a predefined area of interest;

calculating saliency of a plurality of pixels of the first image and the second image, wherein the calculation of the saliency is based on the predefined area of interest;

registering at least two calculated saliencies of consecutive images of the plurality of images, wherein the registration is based on Gaussian pyramids calculated in the salient regions;

comparing a saliency map of the first image with a saliency map of the second image to obtain change using a probability of saliency map, wherein the change is based on a normalized probability difference in the salient regions; and analyzing the change in saliency, wherein the analysis is localized to identify real time change in state of the one or more objects in the unknown environment.

2. The method claimed in claim 1, wherein the ontology comprises a low-level ontology used for extraction of salient features of the unknown environment.

3. The method claimed in claim 1, wherein the real time change includes insertion, disappearance, deformation or displacement of the one or more objects.

4. The method claimed in claim 1, further comprising estimating a difference between the at least two registered saliency maps of the consecutive images by converting saliency values into normalized probabilities using a cost function.

5. The method claimed in claim 1, wherein the calculated saliency of the second image is zero when an object of interest in the frame is showing real time change or the frame is discarded.

6. A system for identifying real time change in state of one or more objects based on ontology, the system comprising:
a memory with a set of instructions;
at least one processor, wherein the at least one processor is communicatively connect with the memory and configured by the instructions to:
capture a plurality of images of an unknown environment, wherein a first image of the plurality of images is a predefined reference for a subsequent second image;
identify at least one salient region of a frame of the first image and at least one salient region of a frame of the second image, wherein the identification of the salient regions is based on ontology of a predefined area of interest;
calculate saliency of a plurality of pixels of the first image and the second image, wherein the calculation of the saliency is based on the predefined area of interest;
register at least two calculated saliencies of consecutive images of the plurality of images, wherein the registration is based on Gaussian pyramids calculated in the salient regions;
compare a saliency map of the first image with a saliency map of the second image to obtain change using a probability of saliency map, wherein the change is based on a normalized probability difference in the salient regions; and
analyze the change in saliency, wherein the analysis is localized to identify real time change in state of the one or more objects in the unknown environment.

7. The system claimed in claim 6, wherein the ontology comprises a low-level ontology used for extraction of salient features of the unknown environment.

8. The system claimed in claim 6, wherein the real time change includes insertion, disappearance, deformation or displacement of the one or more objects.

9. The system claimed in claim 6, wherein the calculated saliency of the second image is zero when an object of interest in the frame is showing real time change or the frame is discarded.

10. The system claimed in claim 6, wherein the area of interest becomes salient in future frames of the plurality of images.

11. The system claimed in claim 6, wherein the processor is further configured to estimate a difference between the at least two registered saliency maps of the consecutive images by converting saliency values into normalized probabilities using a cost function.

12. A non-transitory computer readable medium storing instructions which, when executed by a processor, cause the processor to perform a method for identifying real time change in state of one or more objects based on ontology comprising:
capturing a plurality of images of an unknown environment, wherein a first image of the plurality of images is a predefined reference for a subsequent second image;
identifying at least one salient region of a frame of the first image and at least one salient region of a frame of the second image, wherein the identification of the salient region is based on ontology of a predefined area of interest;
calculating the saliency of a plurality of pixels of the first image and the second image, wherein the calculation of the saliency is based on the predefined area of interest;
registering at least two calculated saliency of consecutive image of the plurality of images, wherein the registration is based on Gaussian pyramids calculated in salient regions;
comparing the saliency map of first image with saliency map of second image to get change using a probability of saliency map, wherein the change is based on normalized probability difference in salient regions; and
analyzing the change in saliency is localized to identify real time change in state of the one or more objects in the unknown environment.

* * * * *